No. 620,335. Patented Feb. 28, 1899.
B. G. LAMME.
METHOD OF AND MEANS FOR VARYING SPEED OF DIRECT CURRENT MOTORS.
(Application filed Sept. 3, 1898.)
(No Model.)
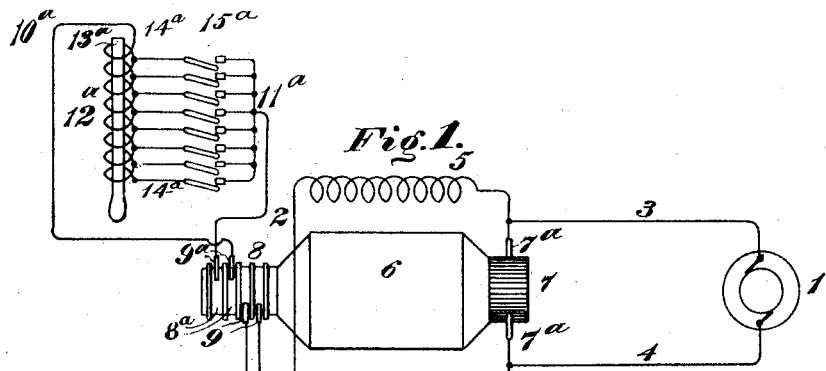
Fig. 1.
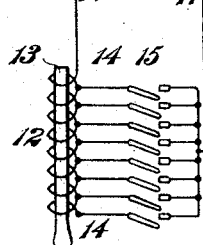
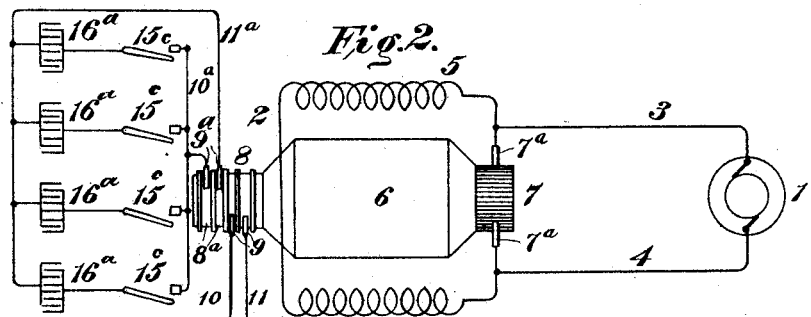
Fig. 2.
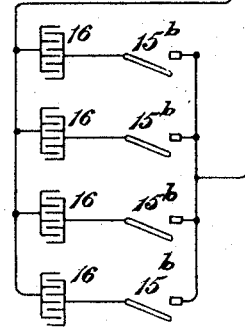
WITNESSES:
Ethan D. Dodds
H. C. Tener
INVENTOR
Benjamin G. Lamme
BY
Wesley G. Carr
ATTORNEY.

UNITED STATES PATENT OFFICE.

BENJAMIN G. LAMME, OF PITTSBURG, PENNSYLVANIA, ASSIGNOR TO THE WESTINGHOUSE ELECTRIC AND MANUFACTURING COMPANY, OF PENNSYLVANIA.

METHOD OF AND MEANS FOR VARYING SPEED OF DIRECT-CURRENT MOTORS.

SPECIFICATION forming part of Letters Patent No. 620,335, dated February 28, 1899.

Application filed September 3, 1898. Serial No. 690,177. (No model.)

*To all whom it may concern:*

Be it known that I, BENJAMIN G. LAMME, a citizen of the United States, residing in Pittsburg, in the county of Allegheny and State of Pennsylvania, have invented a new and useful Improvement in Methods of and Means for Varying the Speed of Direct-Current Electric Motors, (Case No. 787,) of which the following is a specification.

My invention relates to direct-current electric motors; and it has for its object to provide a method and a means whereby the speed of such motors may be varied within comparatively wide limits without varying the direct-current electromotive force and without any changes in the supply-circuit or in the field-magnet excitation or windings.

It has been usual heretofore to vary the speed of direct-current motors by either varying the electromotive force applied to the armature, by varying the field-circuit or the exciting-current therefor, or by a combination of two or more of these methods. These methods are objectionable to a greater or less degree for different reasons well known to those skilled in the art.

By my present invention I propose to vary the armature reaction, and consequently the field-magnet strength, of the motor by connecting one or more auxiliary alternating-current circuits to the armature-winding and varying or adjusting the phase relation between the current and electromotive force in such auxiliary circuit or circuits.

It has been determined that if the current and electromotive force waves supplied by an alternating-current generator are in step the reaction of the armature upon the field-magnet will be substantially zero and that consequently the field-magnet strength will be at a maximum, and that if the current wave lags behind the electromotive force wave by reason of self-induction in the external circuit the armature reaction will be increased and the field-magnet strength will be correspondingly decreased. On the other hand, if the current wave is in advance of the impressed electromotive force wave in the external circuit by reason of the character of the translating devices in such circuit the armature reaction will be such as to strengthen the field-magnet. My present invention is based upon these conditions and may be carried out by means of the apparatus illustrated diagrammatically in the accompanying drawings, in which—

Figure 1 is a diagram of a direct-current motor and two out-of-phase auxiliary circuits, each of which is provided with a variable self-inductive device; and Fig. 2 is a similar view of a direct-current motor provided with two out-of-phase auxiliary circuits, each of which has capacity devices included therein and is provided with means whereby the condenser action may be varied.

Referring particularly to Fig. 1, 1 is a direct-current generator supplying a direct-current motor 2 through conducting-mains 3 and 4. The motor 2 is shown as provided with a shunt field-magnet winding 5, this type of winding being preferred, since the field produced by it should be relatively weak as compared with that due to the armature-winding. The winding of the armature 6 is connected to a commutator-cylinder 7, upon which bear brushes $7^a$, and also to collecting-rings 8 and $8^a$, upon which bear brushes 9 and $9^a$. The latter constitute the terminals of auxiliary circuits 10 11 and $10^a$ $11^a$, having currents in quadrature and respectively provided with self-inductive windings, shown in this instance as choke-coils 12 and $12^a$. The coil 12 is shown as provided with an adjustable core 13 and with a series of leads 14, to which are connected switches 15 for varying the active length of the choke-coil or cutting it out of circuit altogether. The coil $12^a$ is similarly provided with a core $13^a$, leads $14^a$, and switches $15^a$ for the same purpose.

It will be understood that either the movable cores or the means for varying the active lengths of the coils may be employed for varying the self-induction or that both may be used, if desired. In fact, I desire it to be understood that the means employed for adjusting the phase relation between the current and electromotive force in the auxiliary circuits 10 11 and $10^a$ $11^a$ may be of any character and form known in the art.

It will be understood from the foregoing description that if the switches 15 and $15^a$ are all open the motor will run at a normal speed corresponding to the winding, the number of field-magnet poles, and the applied electromotive force. If, however, each of circuits 10 11 and 10ª 11ª be closed by means of the proper switches 15 and 15ª to include one section of coils 12 and 12ª therein, a current lag will be effected in each of said circuits 10 11 and 10ª 11ª, which will serve to increase the armature reaction and consequently to decrease the field-magnet strength, so that the speed of rotation of the armature of the motor will increase. The speed may obviously be further increased to the degree desired by including additional sections of coils 12 and 12ª in circuit by means of the proper switches 15 and 15ª, at the same time taking care to open all switches corresponding to lower speeds. Substantially the same adjustment of phase relation between current and electromotive force may obviously be effected by moving the cores 13 and 13ª greater or less distances into the coils 12 and 12ª.

In Fig. 2 the generator 1 and the several parts of the motor 2 are or may be the same in construction and relation of parts as those shown in Fig. 1. In the respective circuits 10 11 and 10ª 11ª, however, I have shown condensers 16 and 16ª, any one or all of which may be connected in circuit by means of the proper switches 15ᵇ and 15ᶜ, or, when desired, these circuits may be opened. The size and number of these condensers may be anything desired, and they may be connected in circuit otherwise than as illustrated, the arrangement shown being employed merely as indicating that the various motor speeds may be attained by varying the phase relation between the current and electromotive force in the alternating-current auxiliary circuits whether such variation be brought about by a retardation or an advance of the current with reference to the impressed electromotive force.

With the arrangement shown in Fig. 2 it will be understood that a normal speed of the motor corresponding to the applied electromotive force will be secured when the switches 15ᵇ and 15ᶜ are all open and that decreased rates of speed will be secured by including different numbers of condensers or condenser elements in circuit.

I desire it to be also understood that synchronous motors may be employed in lieu of either the choke-coils of Fig. 1 or the condensers of Fig. 2 or in lieu of both of them, since the phase relation between the current and electromotive force may be adjusted where a synchronous motor is employed by adjusting the field-magnet strength of such motor, as is fully set forth in my Patent No. 582,131, dated May 4, 1897.

While the construction specifically illustrated and described embodies two-phase auxiliary alternating-current circuits, such illustration and description are not intended to be exclusive. The use of a single-phase circuit provided with means for varying the relation between current and electromotive force or of a number of out-of-phase circuits greater than two is also within the scope of my invention.

When a plurality of auxiliary circuits is employed for regulating the speed of a motor, it will probably be found advantageous to make use of a combination-switch operated by a single handle in order that a simultaneous adjustment of the several circuits may be readily effected. Such means being well known in the art, however, I have deemed it unnecessary to show the same in the drawings. It will also be understood that my invention is not limited to any specific construction of direct-current motor as regards either the magnetizing or the magnetizable elements of the field-magnet and armature.

I claim as my invention—

1. The method of operating direct-current electric motors at different rates of speed which consists in varying the phase relation between current and electromotive force in the armature-circuit, whereby the armature reaction is varied.

2. The method of varying the speed of a direct-current electric motor which consists in varying the self-induction of the armature-circuit and thereby varying the armature reaction.

3. The method of regulating the speed of a direct-current electric motor which consists in varying the strength of the field by increasing or decreasing the amount of wattless current in the armature circuit or circuits.

4. The combination with a direct-current electric motor, of an auxiliary alternating-current circuit having its terminals connected to the armature-winding and containing means for adjusting the phase relation between the current and the electromotive force in the armature circuit or circuits.

5. The combination with a direct-current electric motor, of an auxiliary alternating-current circuit having its terminals connected to the armature-winding and containing means for varying its self-induction and thereby varying the field strength of the motor.

6. The combination with a direct-current electric motor of means for varying its field-magnet strength comprising an auxiliary alternating-current circuit having its terminals connected to the armature-winding, a self-inductive device and means for connecting more or less of its winding in the auxiliary circuit.

7. The combination with a direct-current electric motor, of a plurality of out-of-phase alternating-current circuits suitably connected to the armature-winding and containing means for adjusting the phase relation between current and electromotive force in the armature circuit or circuits whereby the speed of rotation of the armature is varied.

8. The combination with a direct-current electric motor, of a plurality of auxiliary circuits the terminals of which are so connected to the armature-winding as to receive out-of-phase currents therefrom, and means included in said circuits for adjusting the phase relation between current and electromotive force in the armature circuit or circuits whereby the speed of rotation of the armature is varied.

In testimony whereof I have hereunto subscribed my name this 1st day of September, 1898.

BENJ. G. LAMME.

Witnesses:
   WESLEY G. CARR,
   H. C. TENER.